March 24, 1964   C. E. SMITH   3,125,920
CORNER ROUNDING APPARATUS
Filed March 1, 1961   11 Sheets-Sheet 2

INVENTOR.
Charles E. Smith.
BY Wood, Herron & Evans.
ATTORNEYS.

March 24, 1964

C. E. SMITH 3,125,920

CORNER ROUNDING APPARATUS

Filed March 1, 1961

INVENTOR.
Charles E. Smith.
BY
Wood, Herron & Evans,
ATTORNEYS.

March 24, 1964  C. E. SMITH  3,125,920
CORNER ROUNDING APPARATUS
Filed March 1, 1961  11 Sheets-Sheet 6

INVENTOR.
Charles E. Smith
BY Wood, Herron & Evans.
ATTORNEYS.

March 24, 1964

C. E. SMITH 3,125,920

CORNER ROUNDING APPARATUS

Filed March 1, 1961

INVENTOR.
Charles E. Smith.
BY Wood, Herron & Evans.
ATTORNEYS.

March 24, 1964

C. E. SMITH

3,125,920

CORNER ROUNDING APPARATUS

Filed March 1, 1961

C. E. SMITH 3,125,920

CORNER ROUNDING APPARATUS

Filed March 1, 1961

INVENTOR.
Charles E. Smith.
BY Wood, Herron & Evans.
ATTORNEYS.

3,125,920
CORNER ROUNDING APPARATUS
Charles E. Smith, New Richmond, Ohio, assignor to Bock Machine Company, Cincinnati, Ohio, a corporation of Ohio
Filed Mar. 1, 1961, Ser. No. 92,650
6 Claims. (Cl. 83—454)

This invention relates to a machine for rounding the corners of sheets of paper or other materials, and also to the cutting or rounding heads which act upon the corners of the stack.

One of the primary objectives of the invention has been to provide an improved corner rounding head which may be mounted upon the cross rail of a conventional paper perforating machine, thereby adapting the machine to perforate one edge portion of the paper sheets and concurrently to round the corners thereof.

The invention is intended particularly for perforating and corner rounding paper sheets in stack formation, for example, the sheets which are used as looseleaf fillers, wherein the perforations interfit the snap rings of the looseleaf binder. In some instances, two corner portions of the sheet are round and in other instances, all four corners are provided with round corners.

In general, the conventional perforating machine comprises a table arranged to support the stack of sheets in a drilling position, a cross beam mounted above the table, and a plurality of drill heads mounted on the rail and having rotatable hollow drills projecting downwardly. The drills are located in positions to act upon the stack which is located relative to the axes of the drills by adjustable stops or gauges mounted on the table. Means are provided for rotating the drills and for shifting the cross beam and drills thereof through a cycle of reciprocation, whereby the drills are fed downwardly through the stack and are returned automatically to an elevated position during a return stroke. A machine of this type is disclosed in the patent to W. R. Spiller et al., No. 2,734,577. It will be understood that the Spiller machine performs only the drilling operation. If the corners are to be rounded, this operation is performed on a rounding machine, for example a machine of the type shown in the patent to C. C. Cruzan, No. 2,656,888.

Since the drilling and corner rounding in the past has involved separate operations, concurrent drilling and rounding, according to the present invention, involves a considerable saving in time and labor. Moreover, since the cornering heads of this invention may be mounted on a conventional perforating machine, existing drilling machines may be readily converted to the rounding and drilling operation thereby saving the cost of a separate corner rounding machine. It will also be apparent that the drilling operation can be omitted by equipping a convertional drilling machine with cornering heads in accordance with the invention, but with the drill heads removed from the machine.

A further objective of the invention has been to provide a cornering head having a cutting bit which normally resides in a retracted position (with the cross beam in elevated position) and which is adapted to shift automatically into registry with the corner of the stack as the cross beam descends toward the top of the stack, whereby the rounded corner blends smoothly with the adjoining edges of the sheet.

The stacks of sheets, which are to be perforated and rounded, usually vary to some extent in size, and the adjacent sides of the sheet often deviate slightly from true right angular relationship. When rounding two corners, with the corner rounding heads mounted upon the cross beam adjacent the drill heads, the two adjacent sides of the stack, which contact the gauges on the table, are lined up; hence, the inaccuracy in size and shape is evident on the sides opposite the gauged sides of the stack. This makes it necessary to shift the bit into registry with the corner portion, at least on the corner which is not gauged, although a fixed bit may be used for the corner which is aligned by the gauges. The movable bit for two corner rounding preferably is shiftable along two paths, or universally in a horizontal plane; however, in certain instances, a bit which is movable along a single path may be utilized.

Described briefly, the universal rounding head comprises a mounting block adapted to be mounted upon the cross beam, with a bit holder mounted on the block for universal sliding motion in a horizontal plane, the cutting bit being projected downwardly from the bit holder to present its cutting edge to the stack. A sensing element projects downwardly from the bit holder and beyond the cutting edge in a position to contact adjacent sides of the stack, the sensing elements and bit being movable as a unit. The bit holder is normally held in a retracted position by a spring-loaded presser foot, whereby the sensing elements and bit are backed off from the corner portion of the stack. The spring-loaded presser foot projects downwardly below the cutting end of the bit and is interconnected with the bit holder for controlling its shifting motion.

During the drilling and cutting stroke, the presser foot engages the top tof the stack before the cutting edge reaches the stack; therefore, the foot beings to shift upwardly relative to the descending block. A light compression spring biases the bit holder toward the stack, the arrangement being such that the relative upward motion of the presser foot allows the bit holder to be yieldably urged toward the stack until the sensing elemnts contact its adjacent sides to precisely locate the bit relative to the corner portion before the cutting edge reaches the top of the stack.

A further objective of the invention has been to provide a structure for converting the drilling machine to the rounding of four corners of the stack simultaneously during a drilling cycle.

For this purpose, two cantilever arms or brackets are mounted on the cross beam and project outwardly above the table, one pair of rounding heads being mounted directly upon the cross beam to act upon the rearward corners of the stack, a second pair being mounted upon the arms in position to act upon the forward corners of the stack. In this arrangement, one of the cornering heads which act upon the gauged corner of the stack may be provided with a fixed cutting bit while the remaining heads may be provided with cutting bits which are adjustable universally. In other instances, one or more of the universally adjustable heads may be modified to provide movement along a single path, this head being used in combination with the universal heads.

In order to provide safer and more rapid operation, it is contemplated to provide both the two cornering and four cornering machines with mechanical feeding means, comprising either linear conveyor means or rotary indexing tables. In this instance, the conveyor or table is provided with stack locating fixtures, adapting the stack to be fed in place at a loading station, advanced to the bits at the working station, and finally indexed to an unloading station. According to this concept, the conveyor or table may be interconnected with the drilling machine for automatic operation and the stacks may be loaded and unloaded automatically by suitable mechanism.

According to another aspect of the invention, the four corners of the stack may be rounded during two cycles of operation. This arrangement is intended to avoid interference between the cornering heads and drill heads when working with certain sheet sizes. In this instance, the cornering heads for the rearward corners are mounted directly upon the cross beam and the second pair is mounted upon a single cantilever fixture extending at right angles to the cross beam. An indexing table, provided with stack locating fixtures, indexes through an angle of 90 degrees to advance the stack from a loading station to the first work station for rounding the rearward corners. During the next cycle, the stack is indexed to the second station where the forward edges of the stack are presented to the second pair of cornering heads for rounding while the rearward edges of a successive stack are acted upon at the first station.

The various features and advantages of the invention will be more clearly apparent to those skilled in the art from the following description, taken in conjunction with the drawings.

Drilling Machine

Figure 1:
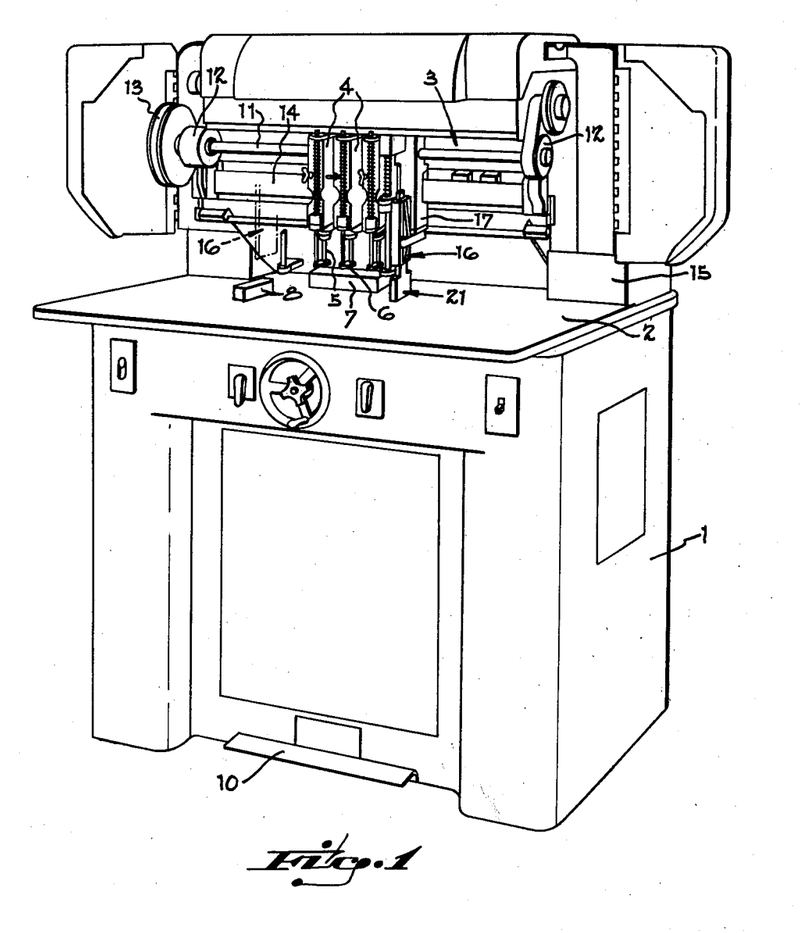
FIGURE 1 is a perspective view of a multiple hole paper drilling machine equipped with corner rounding heads of the present invention, adapting a row of holes to be drilled in a stack of sheets and two corners rounded during each cycle of operation.

The basic drilling machine shown in FIGURE 1 may be utilized in rounding either two corners or four corners of the stack of sheets during the drilling operation, or with the drill heads removed, if no perforations are required. On the other hand, the rounding of four corners can be carried out either in a single operation or in two steps. In the two-step operation, one pair of corners is rounded during the drilling operation, the second pair of corners being rounded in a second operation by indexing the stack of sheets to a second cutting position with respect to a second pair of cutters. The drilling machine may be fed manually, or it may be modified to operate with an indexing table or conveyor for automatic operation, as explained later.

The drilling machine arrangement shown in FIGURE 1 is adapted for manual operation, and is arranged to round the two rearward corners of the stack. In operating the machine, the stack is placed manually upon a work table which includes gauge elements which contact two adjacent sides of the stack so as to position the stack with respect to the perforating drills and with respect to corner rounding dies which normally reside in an elevated position. The operator then initiates the cycle, causing the drills to penetrate the work while the cutting bits trim the corners of the stack.

Described generally with reference to FIGURE 1, the drilling and cornering machine essentially comprises a base 1 having a table top 2 residing at an elevation convenient to the operator. Above the table there is provided a vertically shiftable cross beam 3 upon which is mounted a plurality of drill heads 4, each having a rotatable drill 5 which projects downwardly toward the surface of the table. Each drill includes a spring-loaded presser foot 6 adapted to engage the stack of sheets which is placed upon the table beneath the drill heads. In the present example, the table top 2 is provided with two gauges 7 and 8 which engage the side and rearward edges of the stack of sheets, the stacks being positioned against the gauges by the operator so as to properly locate the stack with respect to the drills to locate the holes to be drilled.

After the stack is placed in position, the operator depresses a treadle 10 which causes the cross beam to descend through its drilling stroke toward the table so as to force the drills through the stack and then to retract to the elevated position ready for the next cycle of operation. The cross beam is shifted through its operating cycle by means of a power mechanism (not shown) located within the base 1, the treadle 10 being interconnected with the driving system to initiate each cycle when the treadle is depressed. The various structural details of the drilling or perforating machine do not form an essential part of the present invention and have therefore been omitted from the disclosure.

The cross beam 3 includes a horizontal drive shaft 11 passing through each drill head 4 and having its opposite ends journalled in bearings 12—12 which are mounted on the cross beam. The drive shaft includes a pulley 13 in driving connection with a motor (not shown), which may also be mounted on the cross beam. The drive shaft 11 includes a longitudinal keyway which establishes a slidable driving connection through suitable gearing journalled within the head and in driving connection with the drill 5 for rotating the drill.

The cross beam 3 includes a dovetail rail 14 parallel with the drive shaft 11, the drill heads being adjustably mounted upon the rail 14, permitting them to be shifted along the rail to locate the hole centers with respect to the gauge bars 7 and 8. The cross beam is guided for vertical motion by means of a column structure 15 which rises above the table 2.

Universal Cornering Head

According to the set-up shown in FIGURE 1, the two rearward corners of the stack, along its drilled edge portion, are rounded during the drilling operation. For this purpose, two cornering heads, indicated generally at 16, are mounted on the dovetail rail 14 at opposite sides of the drill heads 4. The cornering heads 16 are adjustable along the rail to accommodate the size of the stack 9, similar to the drill heads 4.

In the rounding of two corners with the hand fed machine shown in FIGURE 1, two sides of the stack 9 are placed against the gauges 7 and 8; consequently, the rearward left hand corner of the stack will be located accurately with respect to the left hand cornering head. However, should the stack be inaccurate as to length, or should the edges of the stack deviate from a true right angular relationship (FIGURE 30), then the right side of the stack will not register properly with the right hand cornering head.

As a consequence, of this condition, the left hand cutting bit, which acts upon the gauged corner, may be provided with a fixed cutting bit. However, the right hand cornering head is provided with a bit which is shiftable in a horizontal plane, combined with a sensing element which engages the sides of the stack adjoining the corner to be trimmed, thereby to locate the cutting edge of the bit accurately with respect to the right hand corner in spite of deviations in the size or angularity of the stack. In the two corner operation, the right hand bit may be shiftable along two paths, that is universally, thereby to provide precise registry with adjacent sides of the stack in the corner area. Under certain conditions, the bit may be shiftable along a single path, as explained later. Under other conditions both cornering heads may be provided with a universally shiftable bit, whereby both bits adjust themselves to the corners of the stack. The cornering heads, which are indicated generally at 16 in FIGURE 1, represent the several types of cutting heads, which are described in detail later.

By virtue of the localized sensing action provided by the self-adjusting bit, the curved edge of the cutting bit registers with the corner portion of the stack, such that the rounded profile of the corner blends smoothly with the adjoining edges to provide an accurately rounded corner.

Each cornering head 16 includes a spring loaded presser foot, as explained later in detail, which controls the motion of the sensing elements and cutting bit with reference to the stack. In the two corner operation, the stack 9 preferably is located on the table 2 by the gauges 7 and 8 in proper registry with the drills 5. During the drilling operation, the spring loaded presser foot 6 of each drill head engages the top stack under pressure and thus holds it in position on the table. As the drilling operation progresses, the presser foot of each cornering head 16 also engages the stack, causing the sensing fingers to engage the corner portions of the stack, thereby to shift the corner rounding bit into registry with the two sides of the stack adjacent its corner portions.

Described in detail with reference to FIGURES 2–13, the universally adjustable head 16, shown generally in FIGURE 1, comprises a mounting block 17 (FIGURE 2) having a dovetail slot 18 formed in its rearward side, including a gib 19 fitting the rail 14 of the cross beam 3 and engaged by a screw 20 for clamping the block to the rail. The block 17 slidably supports a pair of sensing elements or guides, indicated generally at 21, which contact the edges of the stack (or in some instances the surface of the stack positioning fixtures) so as to shift the rounding bit 22 with respect to the corner portion of the stack before the cutting edge reaches the stack during the downward stroke of the cross beam. In the universally adjustable structure, the sensing elements and bit are shifted toward the corner portion of the stack along a diagonal path until the sensing elements contact the adjacent sides of the stack (or contact stack locating fixtures). If one of the sensing elements engages the stack or fixture in advance of the other, then the diagonal path of motion is modified until the second sensing element contacts its gauging surface, thus locating the cutting edge of the bit accurately in cutting position.

Figure 6:
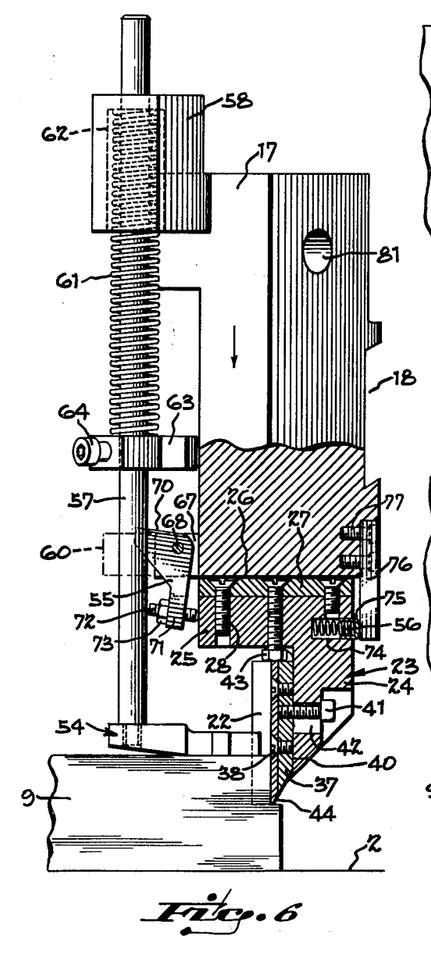
FIGURE 6 is a view similar to FIGURE 5, further illustrating the cutting action of the bit.
Figure 7:
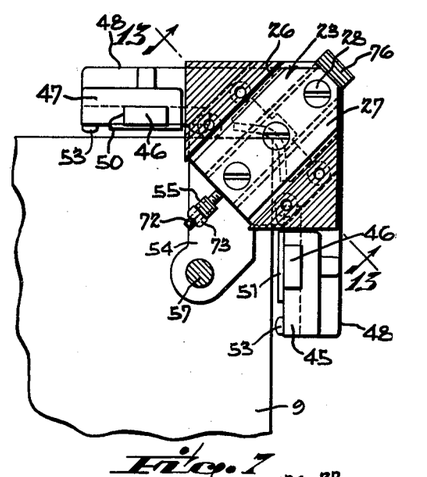
FIGURE 7 is a sectional view taken along line 7—7 of FIGURE 4, further detailing the universally shiftable sensing element and bit mounting slide or holder, the parts being shown in retracted position with respect to the stack of sheets.
Figure 8:
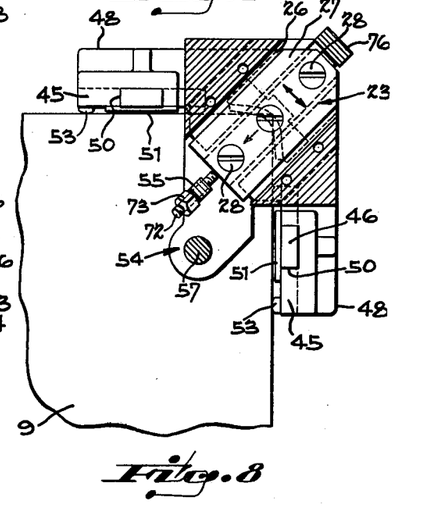
FIGURE 8 is a sectional view taken along line 8—8 of FIGURE 5, showing the sensing elements shifted into engagement with the adjacent sides of the stack to locate the cutting bit with respect to the corner portion of the stack.
Figure 9:
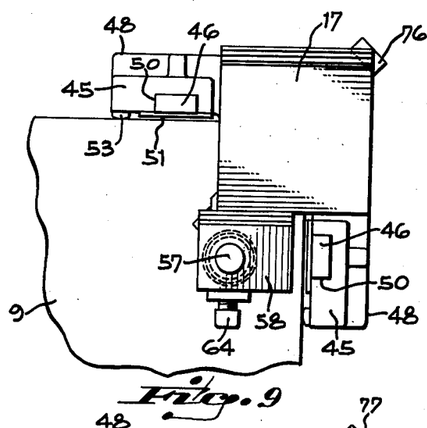
FIGURE 9 is a top plan view of the cornering head with the parts in a cutting position corresponding to FIGURE 8.
Figure 10:
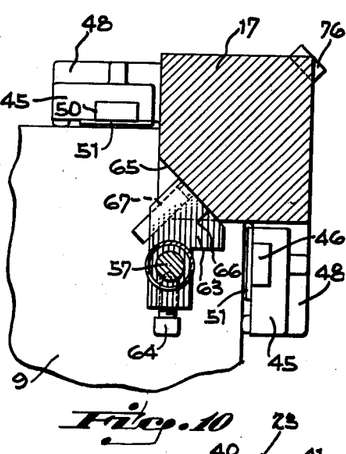
FIGURE 10 is a sectional view taken along line 10—10 of FIGURE 4, further detailing the cutting head structure.

In order to provide universal shifting of the bit 22, it is mounted on a bit holder or slide 23 (FIGURES 6–8), the bit holder in turn being mounted at the lower end of the block 17 and shiftable in two directions, as indicated by the arrows in FIGURE 8. The bit holder 23, as viewed in FIGURE 6, is generally right angular in shape, comprising a vertical piece 24 and a horizontal head portion 25, which form a slide element. For mounting purposes, the lower end of the mounting block 17 includes a diagonal slot 26 (FIGURE 7) and the horizontal head portion 25 includes a slide plate 27 attached to the head 25 by screws 28. The bit holder 23 is slidably confined in position by means of retainer plates 30—30 (FIGURE 13) attached to block 17 by screws 31 and underlying the side portions of the slide plate 27 at opposite sides.

The head portion 25 is slotted as at 32 (FIGURE 13) to accommodate the retainer plates, the slots providing clearances 33 at opposite sides of the retainer plates. A similar clearance 34 is provided by the slot 26 on opposite sides of the slide plate 27. These side clearances permit movement of the bit holder 23 laterally relative to the diagonal slot, as indicated by the arrow in FIGURE 8. The slide plate 27 also permits movement of the bit holder 23 in a longitudinal direction, as indicated by the arrows in FIGURE 5, thus providing universal adjustment within the limits indicated.

Figure 4:
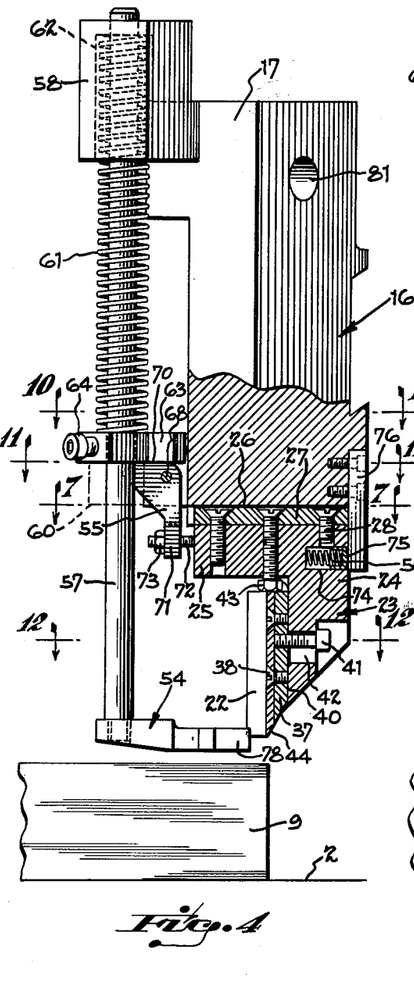
FIGURE 4 is a side elevation partially in section, showing the cornering head, with the head turned about its vertical axis from the position of FIGURE 2 to more clearly illustrate the structure of the cutting bit and holder.

The rounding bit 22 (FIGURE 12) is generally right angular comprising a curved portion 35 joined by straight sections 36—36 which are disposed at an angle somewhat greater than 90 degrees to permit the curved portion to blend smoothly with the straight sides of the sheets adjoining the rounded corner. The bit is mounted in an adaptor plate 37 and secured thereto by screws 38 (FIGURE 4). The adaptor plate 37 interfits a vertical slot 40 (FIGURE 12) formed in the vertical limb 24 of the bit holder. The adaptor 37 and cutting bit form a unit mounted for vertical adjustment by means of a clamping screw 41 which passes through a slot 42 of limb 24 and into threaded engagement with the adaptor plate 37.

A vertical adjustment screw 43 (FIGURE 4) threaded into the head 25 of the bit holder, engages the upper end of the retainer plate and bit. This screw resists the upward force which reacts against the rounding bit as it is forced downwardly with respect to the stack of sheets. The lower edge of the bit 22 is tapered at at 44 delineating a cutting edge. During the cutting stroke, the taper tends to urge the bit inwardly toward the stack.

The sensing elements or guides 21, as noted earlier, are mounted for movement with the cutting bit in a horizontal plane; however, they are mounted for sliding movement relative to the bit in the vertical plane during the cutting stroke. In other words, in manual operations, using two rearward cornering heads (FIGURE 1) the lower ends of the sensing elements rest upon the surface of the table or stack fixture during the cutting stroke, such that the bit holder and bit move downwardly relative to the sensing elements as the corners of the stack are cut. However, in automatic operations (two or four corners), using fixtures to locate the stack, the sensing elements are fixed to the rounding head so as to be shifted to an elevated position when the head rises after the cutting stroke. This is necessary in order to provide clearance for the stack and its locating fixtures as the stack is fed to cutting position.

Figure 2:
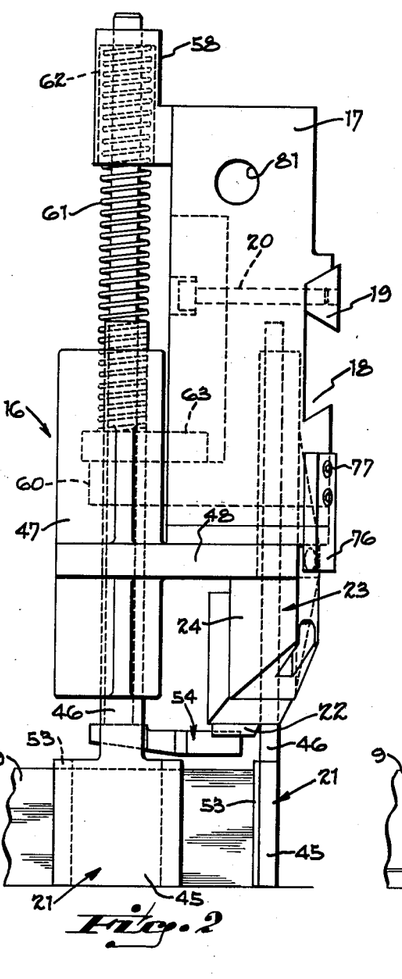
FIGURE 2 is a side elevation of one of the cutting or cornering heads removed from the machine. This head is of the type wherein the rounding die or cutter is shiftable universally that is, in two directions to provide accurate registry of the bit with the corner portion of the stack of sheets as the bit descends toward the top of the stack during the cutting stroke.
Figure 3:
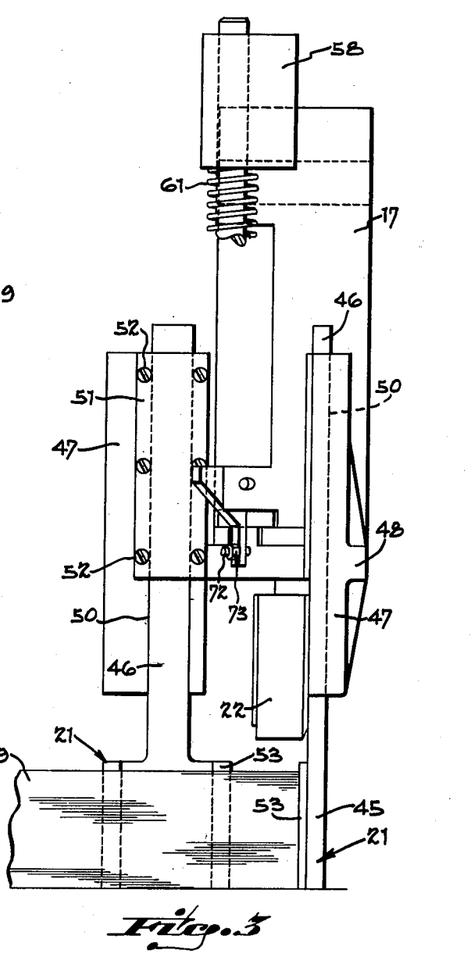
FIGURE 3 is a front view of the cornering head as projected from FIGURE 2.

As viewed in FIGURES 2 and 3, each sensing element 21 comprises a rectangular contact plate 45 having a vertical bar 46 slidably mounted within a vertically slotted bracket 47. When the universal head is used in automatic operations, the bar 46 is clamped to the bracket so that the sensing elements are elevated with the head to allow the stack and fixtures to be fed to the work station. As viewed in FIGURE 7, the head portion 25 of the bit holder 23 includes a pair of arms 48—48 disposed at right angles to one another, the brackets 47 being carried by the outer ends of the arms 48. Each bracket 47 includes a vertical slot 50, the bar 46 being slidably interfitted in the slot. The bar 46 is confined within the slot by a cover plate 51 (FIGURE 3) which is attached by screws 52.

Each gauge plate 45 includes a pair of vertical contact ribs or beads 53—53 (FIGURE 7) which are spaced outwardly from the adjacent sides of the stacks 9 (or fixture surface) when the cornering heads are in the elevated position. These ribs establish a line contact with the side of the stack (FIGURE 8) so as to locate the cornering bit with reference to the stack as the cutting edge of the bit moves toward the top of the stack at the beginning of the cutting and drilling stroke.

Figure 5:
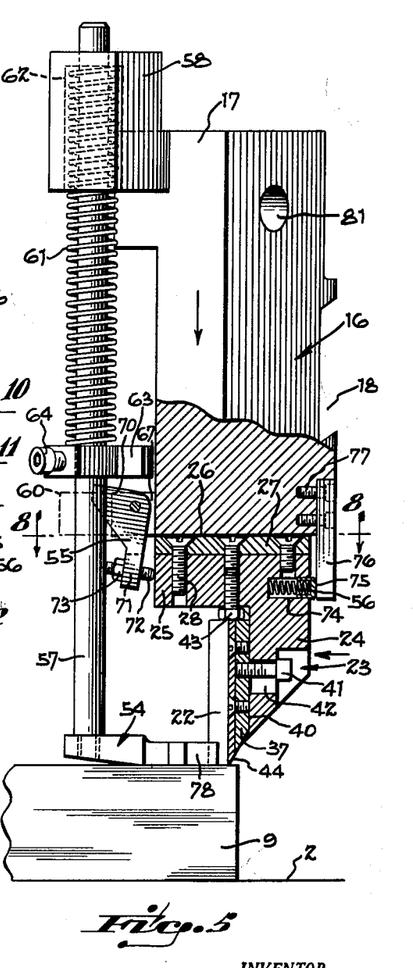
FIGURE 5 is a view similar to FIGURE 4, showing the action of the parts as the cornering head descends during its cutting stroke.

The contact plate and cutting bit are shifted toward the corner portion of the stack by operation of a spring-loaded presser foot 54 (FIGURES 4 and 5). In the elevated position of the cornering head, the presser foot is spaced above the top of the stack, and as the head descends, the presser foot engages the top of the stack (FIGURE 5) and exerts pressure upon the stack, as explained later. The presser foot is interconnected with the bit holder by means of a trip lever indicated at 55 which pivots, as shown in FIGURES 4 and 5, in response to relative motion of the presser foot and cornering head. In order to shift the bit holder and gauge plates toward the corner portion of the stack (or fixture) during pivotal motion of lever 55, there is provided a compression spring 56 engaged against the bit holder 23 and arranged to urge the holder toward the corner portion of the stack. By virtue of the spring action, the sensing elements are pressed under predetermined pressure against the stack to position the bit accurately but without sufficient force to disturb the stack.

Described in detail, the presser foot 54 is mounted upon the lower end of a vertical rod 57 which is slidably mounted in upper and lower lugs 58 and 60 which project outwardly from the mounting block 17 (FIGURES 3–6). A compression spring 61 has its upper end seated in a recess 62 formed in the upper lug 58; its lower end is seated against an actuator block 63 which is adjustably clamped to the rod 57 by a set screw 64. As viewed in FIGURE 10, the corner portion of the mounting block 17 is machined to provide a diagonally relieved area, as indicated at 65, and the actuator block 63 includes a diagonal edge 66 interfitting the relieved portion 65.

Figure 11:
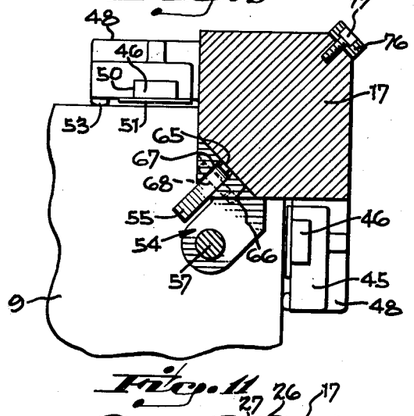
FIGURE 11 is a sectional view taken along line 11—11 of FIGURE 4, illustrating the trip lever which adapts the sensing element and cutting bits to move into registry with the corner portion of the stack during the downward motion of the head toward the stack, as shown in FIGURE 5.

As viewed in FIGURE 11, the lower portion of the block 17 beneath the diagonally relieved area 65, is slotted as at 67 to receive the trip lever 55, the lever being pivotally carried by a pin 68 passing through the lever 55. The trip lever (FIGURE 4) is generally right angular in profile having a horizontal limb 70 and a vertical limb 71. An adjustment screw 72 passes through the vertical limb and is locked in adjusted position by a nut 73.

In the elevated position of the cornering head (FIGURE 4) the compression spring 61 forces the actuator block 63 against the horizontal limb 70. In this position, the set screw 72 forces the bit holder 23 to the right away from the stack, counter to the compression spring 56. As the cornering head descends, the presser foot engages the top of the stack and is forced upwardly relative to the head, thus elevating the actuator block. This causes the compression spring 56 to force the bit holder toward the left, as indicated in FIGURE 5, thus shifting the lever to the angular position shown in this view.

The compression spring 56 (FIGURE 5) is mounted in a bore 74 formed in the bit holder. A cap 75 encloses the outer end portion of the spring and slidably interfits the bore 74. The cap 75 is seated against a backing plate 76 which is secured to the lower portion of block 17 by screws 77.

Figure 12:
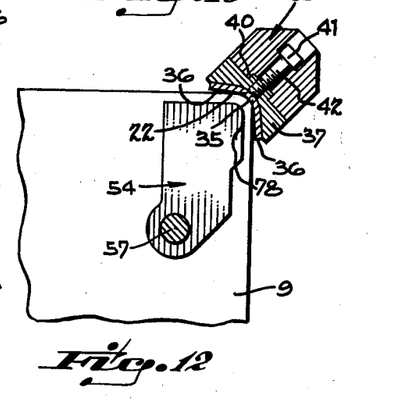
FIGURE 12 is a sectional view taken along line 12—12 of FIGURE 4, detailing the mounting arrangement of the corner rounding bit and the relationship of the presser foot.
Figure 13:
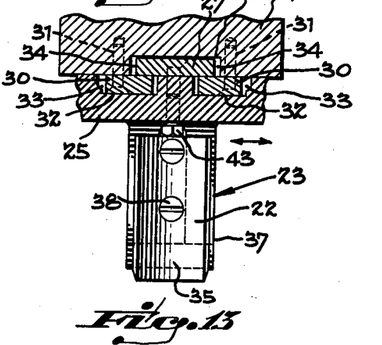
FIGURE 13 is a sectional view taken along line 13—13 of FIGURE 7, further illustrating the slidable bit holder and rounding bit thereof.

As viewed in FIGURE 12, the presser foot 54 extends laterally from the slide rod 57 and includes lateral portion 78 which projects toward the cutting bit and corresponds in shape to the corner portion of the stack. As the block 17 descends, the compression spring 61 applies pressure to the foot 54, thereby to clamp the stack 9 against the table 2 as the sensing elements 21 move into contact with the corner portions of the stack. Contact of the sensing elements is established before the cutting edge of the bit reaches the stack, as noted earlier.

During the cutting stroke, the cutting resistance reacts upwardly through the bit holder, tending to hold it in a stationary position by frictional engagement with the mounting block. The presser foot remains engaged against the top of the stack during the cutting operation (FIGURE 6) which continues until the cutting edge reaches the surface of the table. This portion of the table may be formed of wood or other relatively soft material to avoid damage to the cutting edge of the bit. At completion of the cutting stroke, the head is retracted and the parts assume the position of FIGURE 4, ready for the next cycle.

When setting up the machine for two corner rounding (FIGURE 1) the cornering heads 16 are adjusted along the rail 14 to locate the cutting bits 22 according to the size of the stack, then the heads are locked in place by tightening the screws 20 which draw the gibs 19 into engagement with the rail. Since the cornering heads are mounted adjacent the drill heads 4 and in line therewith, the block 17 is provided with clearance bore 81 (FIGURE 2) adapting the drive shaft 11 to pass without interference through the block 17. To facilitate setting up the machine, the drive shaft 11 may be removed in a convenient manner.

*Four Corner Rounding (Hand Feed)*

Figure 16:
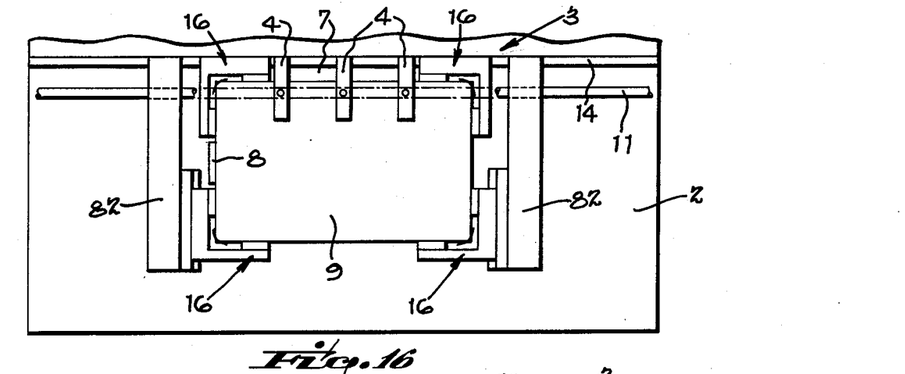
FIGURE 16 is a diagrammatic top plan view of the drilling machine equipped with the mounting brackets and cutting heads according to FIGURE 14 for rounding the four corners of the stack during a single cycle.

When the machine is set up four corner rounding during each cycle, two additional outboard cornering heads may be mounted on the cross head 3, as indicated diagrammatically in FIGURE 16. This view corresponds with the machine shown in FIGURE 1, utilizing three drill heads 4, as described earlier, two of the cornering heads 16 being mounted directly upon the rail 14 of the cross beam, the outboard heads being mounted upon cantilever brackets, indicated generally at 82, which are adjustably attached to the rail 14.

Figure 17:
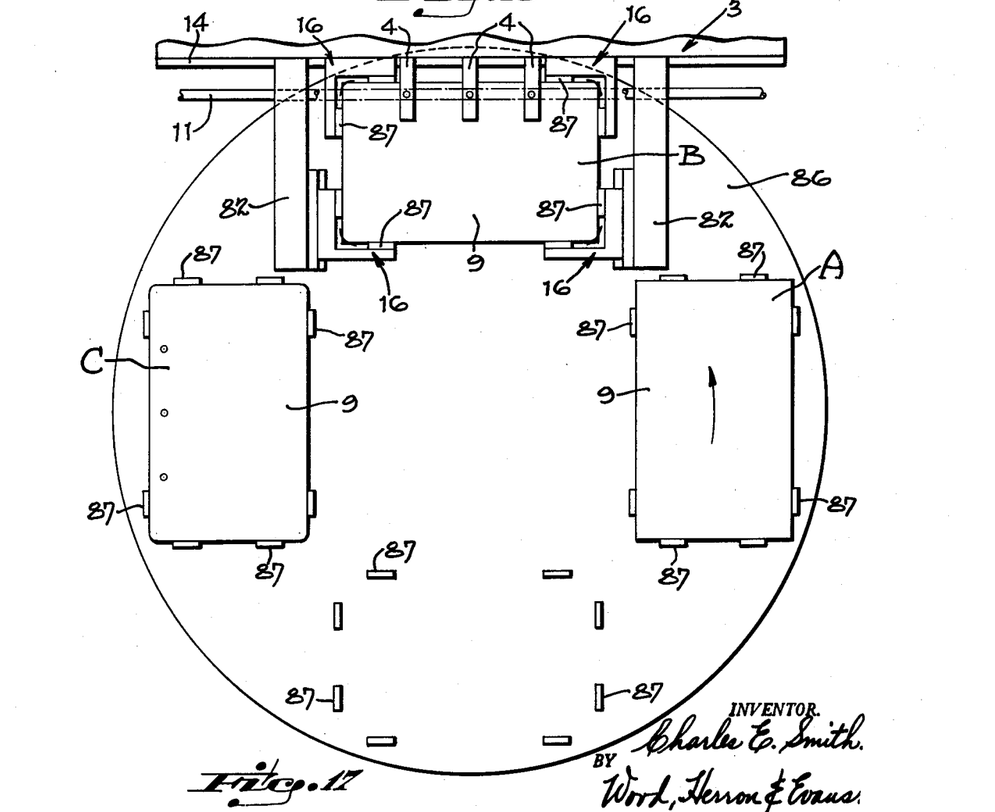
FIGURE 17 is a diagrammatic view similar to FIGURE 16, but showing the machine equipped with an indexing table for feeding the stacks of sheets in a circular path with respect to the cutting heads for rounding the four corners during each cycle of operation.
Figure 18:
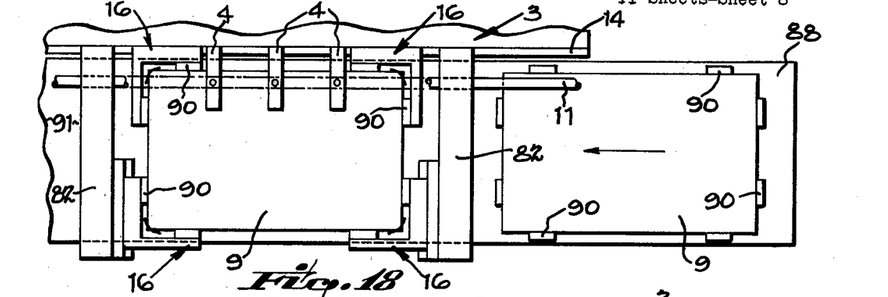
FIGURE 18 is a diagrammatic view similar to FIGURE 16, showing a conveyor or reciprocating table arranged to feed the stacks to the work station for rounding the four corners in a single operation.
Figure 31:
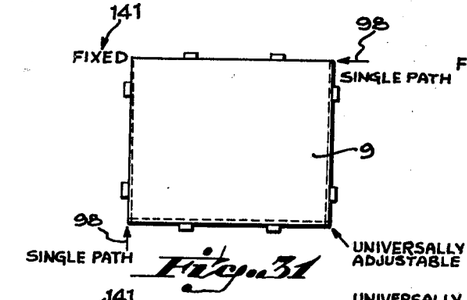
FIGURE 31 is a diagrammatic view similar to FIGURE 30, showing the stack and arrangement of cutting bits for rounding the four corners in a single operation.
Figure 32:
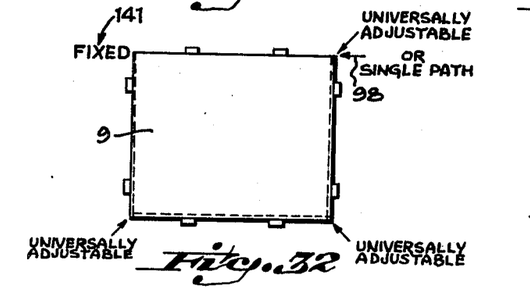
FIGURE 32 is a view similar to FIGURE 31, showing a modified arrangement of bits for the four corner rounding operation.

Rounding of the four corners presents problems which are not present in the two cornering operation shown in FIGURE 1. Thus, as shown in FIGURES 31 and 32, if the sheets are not accurately squared, as indicated by the broken lines, it is necessary to compensate for the inaccuracy at three corners of the stack. In the arrangement shown in FIGURE 31, one of the rounding bits is fixed, two are movable along a single path, and the remaining bit is shiftable universally. In the arrangement shown in FIGURE 32, one of the rounding bits is fixed and the remaining three are shiftable universally. Either one or the other of these arrangements may be used in the simultaneous round cornering arrangements which are shown in FIGURES 16, 17 and 18. The four heads shown diagrammatically in FIGURES 16–18 represent the several types of cornering heads referred to above. The details of the single path and fixed rounding heads are described later with reference to FIGURES 20–29.

According to the arrangement shown in FIGURE 16, the stacks 9 are fed to the table manually from the front of the machine, as explained earlier with reference to FIGURE 1. In this instance, two sides of the stack are engaged against the stops 7 and 8 so that the corner of the stack, beneath the fixed bit, is aligned vertically. In order to provide clearance for the stacks, the forward sensing elements 21 are fixed to the heads so as to rise with the cross beams, while the rearward sensing elements may be slidably mounted.

Described in detail, each cantilever bracket 82 includes a dovetail slot 83 (FIGURES 14 and 15) which interfits the rail 14 of the cross beam and includes a gib 19 secured in place by screws 20, as explained earlier with respect to the head 17. The bracket is of rigid box-like construction and includes a slot 80 providing clearance for the drive shaft 11. The portion 84 above the slot 83 is arranged to reside in abutment with the upper portion of the cross beam 3 to resist the upward force which acts upon the brackets during the cutting operation. The side of the bracket 82 includes a dovetail rail 85 which corresponds with the rail 14 of beam 3 for mounting the outboard cornering head 16, the heads being arranged to be interchangeably mounted on the cross beam or on the cantilever bracket. The head 16 also includes a gib 19, as explained earlier.

Figure 14:
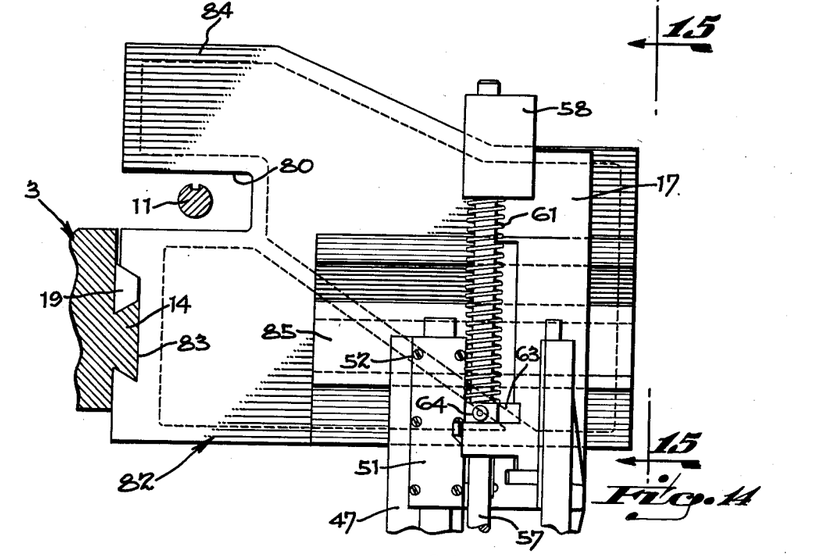
FIGURE 14 is a cross section through the cross rail or beam of the drilling machine, detailing one of the hangers or brackets which are used in mounting a second pair of cutting heads on the machine, whereby the machine is adapted to round the four corners of the stack during each cycle of operation.
Figure 15:
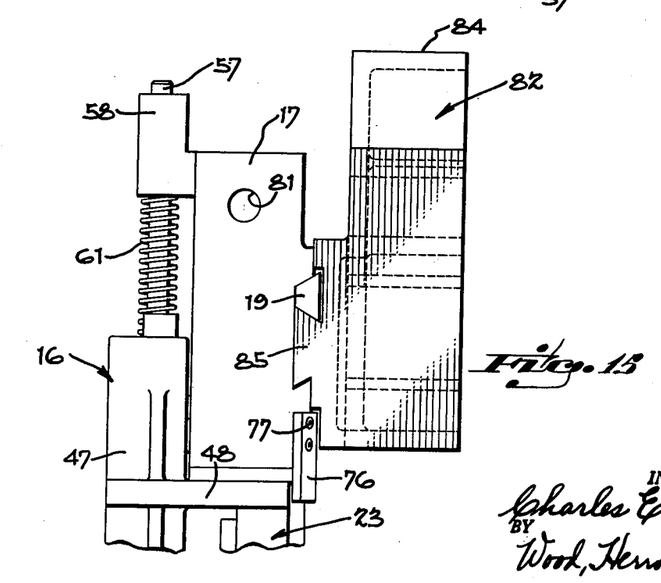
FIGURE 15 is an end view taken along line 15—15 of FIGURE 14, further illustrating the mounting bracket and one of the outboard cutting or cornering heads.

It will be understood at this point that the outboard heads may be shifted along the rail 85 and locked in position by a clamping screw 20, which tightens the gib 19, as explained above. The brackets 82 likewise may be shifted bodily along the rail 14 and clamped in position by its gib 19. The two coordinates of adjustment thus facilitate setting up the machine for stacks of different sizes. During the cornering operation, the four rounding bits concurrently shift in toward the corner portions of the stack under control of the sensing fingers, as explained above.

*Turret Feed*

In the arrangement shown in FIGURE 17, the outboard rounding heads are mounted in cantilever brackets 82, as in FIGURE 16, and the stacks 9 are fed into the work station by means of an indexing table, indicated diagrammatically at 86. In this arrangement, the table is indexed in the direction indicated by the arrow through an arc of 90 degrees for each cycle of operation, so as to advance an untrimmed stack of sheets from the loading station, as indicated at A, to the working station B. The trimmed and drilled stack is advanced from the working station to the unloading station, as indicated at C.

In order to properly position the stack with respect to the cutting bits, the table 86 is provided with suitable locating fixtures, indicated diagrammatically at 87, which embrace the sides of the stack, thereby to position the stack with respect to the drills. In this instance, one corner of the stack is aligned and is positioned to be acted upon by the fixed rounding bit, as explained earlier with reference to FIGURE 1. It will be understood that the drilling machine indicated in FIGURE 17 is similar to the machine shown in FIGURE 1 except for minor modifications to accommodate the indexing table. This arrangement may be utilized with suitable conveyors to advance the untrimmed stack to the loading station and to carry away the finished stacks from the unloading station.

The cutting heads, which are indicated generally at 16 in FIGURE 17, also may comprise universally shiftable heads, combined with single path and fixed heads, as described above with reference to FIGURE 16. The stack thus is positioned with respect to the drills by operation of the turret and its fixtures, then the bits are adjusted with respect to the corner portions by the sensing fingers during the cutting and drilling operation.

According to the arrangement shown in FIGURE 17, the perforating and rounding operation may be performed in an automatic manner. Thus, the individual stacks may be advanced automatically by an infeed conveyor to the receiving station A, to be engaged by the fixture 87. Thereafter, the turret is indexed through its 90 degree angle to rotation to advance the stack to the work station B, the turret at the same time advancing the previously rounded and drilled stack to the discharge station C, where the stack may be advanced automatically to a discharge conveyor. After the indexing cycle, the machine cycle may be initiated in an automatic manner.

*Four Corner Rounding (Linear Feed)*

According to the arrangement shown diagrammatically in FIGURE 18, the drilling machine is arranged to round the four corners of the stack, utilizing the same arrangement of cornering heads as shown in FIGURES 16 and 17. In this arrangement, the several heads may also be of universal, single path and fixed type used in combination, as described with reference to FIGURES 16 and 17.

As indicated diagrammatically in FIGURE 18, the unfinished stacks 9 are advanced to the drilling machine by a conveyor 88, which includes suitable fixtures 90 for embracing and locating the stack. The conveyor 88 may be either of the endless belt type, or it may represent a reciprocating table mounted adjacent the drilling machine. After the rounding and drilling operation, the finished stacks may be transported from the machine by a discharge conveyor, indicated diagrammatically at 91. The stacks may be advanced to the conveyor 88 either by hand or through operation of automatic feeding means. When arranged for automatic operation, the drilling machine may be interconnected with the conveyor 88 to initiate the drilling and cornering cycle each time the conveyor advances an unfinished stack to the machine.

*Two-Station Four Corner Rounding*

Figure 19:
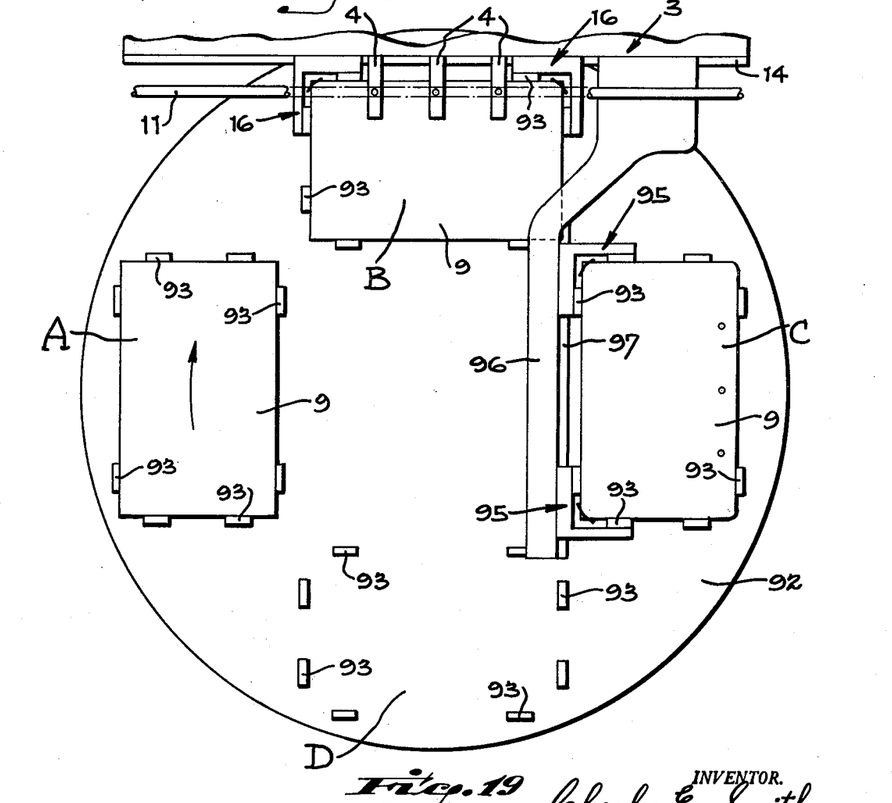
FIGURE 19 is a diagrammatic top plan view showing an arrangement wherein the machine is equipped with two work stations (pairs of cornering heads) and an indexing table, whereby two corners are rounded during the drilling operation at the first station, the remaining two corners being rounded by indexing the stack through an arc of 90 degrees to the second station.

According to the arrangement shown in FIGURE 19, the two rearward corners of the stack are rounded during the drilling operation as in FIGURE 1, and the forward two corners are rounded by indexing the stack 90 degrees to a second work station. This arrangement is intended particularly for finishing stacks wherein the required location of the holes would cause interference between the drill heads and corner rounding heads. Since the cornering heads operate on two corners only at each station, they are preferably of the type described with reference to FIGURE 1.

In the two station machine, the unfinished stacks are advanced to an indexing table 92 provided with stack positioning fixtures 93, similar to the structure shown in FIGURE 17. The cross beam 3 includes drill heads 4 and cornering heads 16, as described with reference to FIGURE 1, for perforating and rounding one edge of the stack upon each reciprocation of the cross beam. After this operation, the table is indexed through an angle of 90 degrees so as to advance the stack to the second station, such that the forward edge of the stack is presented to a second pair of cornering heads, indicated generally at 95—95 for rounding the forward corners during the next stroke of the cross beam. These heads, as noted above, are also of the type described with reference to FIGURE 1 and are mounted upon a cantilever arm 96. The cantilever arm 96 is attached to the dovetail rail 14 of the cross beam 3, the arm being adjustable along the rail to compensate for the dimensions of the stack. The cornering heads 95 are adjustably mounted on a dovetail rail 97, similar to rail 14, adapting the heads to be adjusted with respect to the arm 96. If desired or necessary, the table 92 may be indexed in a direction opposite to that indicated, in which case the forward corners are first rounded, then the stack is indexed for drilling and cornering the rearward edge.

The two station operation may be carried out manually, in which case the stacks are loaded into the fixtures at a loading station indicated at A, to be indexed to the first work station indicated at B, then indexed to the second work station C, and finally to the unloading station indicated at D. If desired, the stack may be advanced automatically to the loading station A by a suitable conveyor and unloaded from station D by a discharge conveyor. In this event, the operation of the conveyor, indexing of the table, and operation of the drilling machine may be coordinated, as noted with reference to FIGURE 17.

*Single Path Cornering Head (Automatic Feed)*

Figure 30:
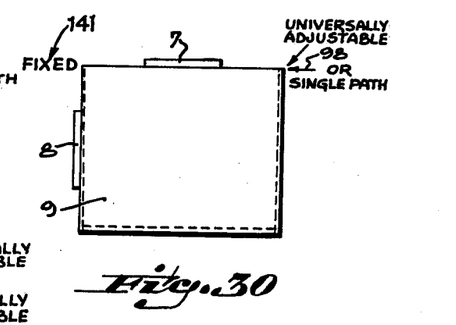
FIGURE 30 is a diagrammatic view showing the stack and relationship and motion of the cutting bits when arranged for rounding the two rearward corners, as shown in FIGURE 1.

The single path cornering head, which is indicated diagrammatically at 98 in FIGURES 30–32, is generally similar to the universal head, except that the rounding bit 22 moves in a single path, as distinguished from universal motion. Referring to FIGURES 20–24, the structure includes a mounting block 100 adapted to be mounted upon the dovetail rail 14 of the cross beam 3, a spring loaded presser foot 101 engageable with the top of the stack 9, and a stack sensing element 102 which is attached to the bit holder 103. The bit holder includes a rounding bit 22.

The bit holder 103 includes a slide plate 104 slidably confined in a slot 105 formed in the lower end of the mounting block 100. The bit holder is adapted to move directly toward the surface of the fixture in a straight line path, as indicated by the arrow in FIGURE 22, in response to operation of the presser foot 101. The construction of the bit holder 103 is generally similar to the holder 23 of the universal head, except that the side clearances 33 and 34 of the slide plate have been omitted to eliminate lateral shifting.

Figures 20, 21, 22, 23, 24:
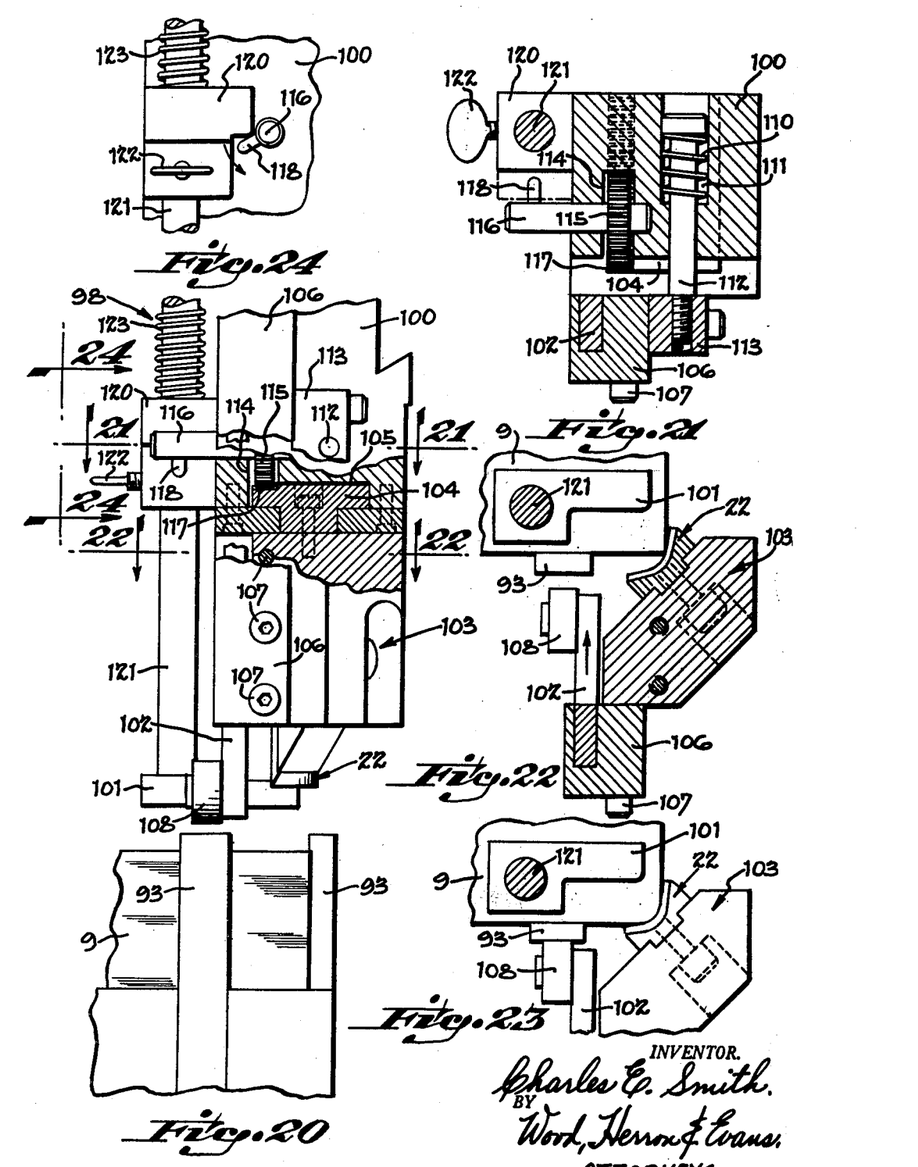
FIGURE 20 is a side elevation, partially in section, showing a cutting head wherein the rounding bit is shiftable along a single path, as distinguished from the universally shiftable bit shown in FIGURES 2–13. This head is used in conjunction with stack fixtures in automatic cornering operation.
FIGURE 21 is a sectional view taken along line 21—21 of FIGURE 20, illustrating the rack and pinion arrangement which controls the shifting motion of the corner rounding bit and sensing element.
FIGURE 22 is a sectional view taken along line 22—22 of FIGURE 20, further detailing the bit holder and sensing element, the bit being shown in its retracted position with respect to the corner portion of the stack.
FIGURE 23 is a view similar to FIGURE 22, showing the bit and sensing element shifted inwardly to cutting position with the bit in registry with the corner portion of the stack.
FIGURE 24 is a fragmentary side view illustrating the actuating finger which interconnects the bit holder with the presser foot.

Since the head (FIGURE 20), is intended for automatic operation, the sensing element must be elevated with the head assembly to provide clearance for indexing the stack and its fixtures. The sensing element 102 is clamped in a block 106 (FIGURE 22) which is attached to the bit holder 103 by screws 107 for movement with the bit holder and bit toward one side of the stack. The lower end of the sensing element includes a roller 108 which engages the surface of the fixture 7 during the cutting and drilling stroke. The sensing element and bit holder normally reside in a retracted position, wherein the bit 22 is spaced outwardly from the corner portion along one side of the stack, as shown in FIGURE 22.

As the head 98 descends during the cutting stroke, the presser foot 101 engages the top of the stack and is shifted upwardly relative to the block 100. This motion causes the bit holder assembly to shift toward the corner of the stack (FIGURE 22) until the roller 108 of the sensing element 102 contacts the surface of the fixture to bring the cutting bit into registry with the corner portion of the stack. In order to provide this motion, the bit holder is spring-biased toward the stack and is normally held in the retracted position (FIGURE 22) by the presser foot, with the foot in its extended position, free of the stack. The presser foot is spring-loaded toward its extended position and is interconnected through a rack and pinion drive with the bit holder to normally force the bit holder to its retracted position, as explained below.

Described in detail (FIGURE 21), the bit holder 103 is urged toward the stack by a compression spring 110 having one end seated within a bore 111 formed in the block 100. The opposite end of the spring is seated against the head of a shoulder screw 112 threaded into a block 113 attached to the slide block 106, which in turn, is attached to the bit holder 103, such that the spring 110 acts upon the bit holder. The block 100, adjacent the bore 111, is slotted as at 114 to accommodate a pinion 115 keyed to a rock shaft 116 which is journalled in the block. Pinion 115 meshes with rack teeth 117 (FIGURE 20), which are formed in the slide plate 104.

The rock shaft 116 includes a finger 118 (FIGURES 21 and 24) which is engaged by an actuating block 120. The actuating block 120 is clamped in an adjusted position along the presser foot rod 121 by a thumb screw 122. A compression spring 123, seated against the actuating block 120, biases the actuating block and presser foot downwardly, thereby normally biasing the rock shaft 116 in the direction indicated by the arrow in FIGURE 24. This rotates the pinion 115 in a direction to force the bit holder to its retracted position, counter to the compression spring 110.

When the presser foot 101 engages the top of the stack 9, continued downward motion of the rounding head assembly relative to the stationary presser foot shifts the rock shaft 116 and its finger 118 downwardly with respect to the stationary rod 121 and actuating block 120. This allows the pinion 115 to rotate under the influence of compression spring 110, thus shifting the bit holder toward the stack (FIGURE 23).

Since the stack of sheets is located on the table for automatic operation by means of fixtures (fixtures 87, 90 or 93—FIGURES 17–19) which locate the stack with reference to the drills, the roller 108 is arranged to contact the outside surface of the fixture in locating the cutting bit with reference to the side of the stack. It will be understood that the location of the bit with respect to the roller compensates for the thickness of the fixture so as to bring the bit into proper registry with the side of the stack.

*Single Path Head (Manual Feed)*

When the single path cornering head is utilized with a hand feed machine, for example, in rounding the two rearward corners as in FIGURES 1 and 30, the sensing element 127 may remain in contact with the table, at all times. In other words, the stack 9 is located with reference to the drills by the table gauges or fixtures 7 and 8; hence, the sensing elements need not be elevated above the table to clear the stack and work fixtures as in automatic feeding.

As previously described with reference to FIGURES 20–24, the single path cornering head for manual feed comprises a mounting block 100 having a single path bit holder 103 mounted by means of a slide plate 104 (not shown) for single path motion. The bit holder is biased toward the corner of the stack by a compression spring 110, and the holder is normally held in its retracted position by a pinion 115 engaging rack teeth 117 formed in the slide plate and controlled by the presser foot. Since the structure is disclosed with reference to FIGURES 20–24, the details have been omitted from the present disclosure.

Figure 25:
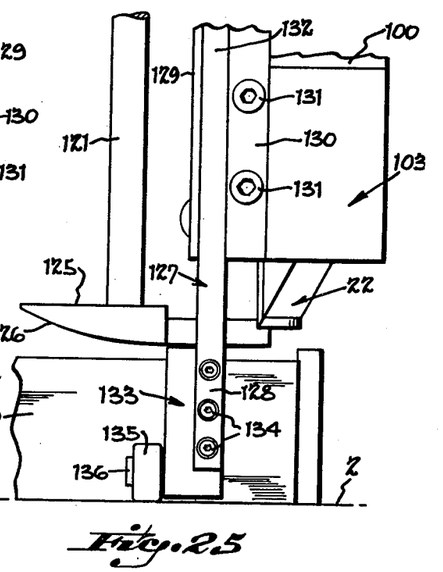
FIGURE 25 is a fragmentary side elevation similar to FIGURE 20, showing the single path cutting bit and sensing element which is used in two corner rounding with manual feed, as indicated in FIGURES 1 and 30.

In the present structure the presser foot 125, which is mounted on the presser foot rod 121, includes an upwardly curved surface 126 facing the front of the table to facilitate the feeding of the stacks into cornering position. The presser foot engages the top of the sheet during the cutting stroke and thereby causes the rounding bit to shift toward the stack through operation of the actuating block 120 and pinion 115, as described earlier.

In order to allow the sensing element to remain in contact with the surface of the table 2 at all times, the sensing element 127 is attached to a vertical bar 128, which is slidably mounted in a vertical guide 130, attached by screws 131 to the bit holder 103. The guide 130 includes a spacer bar 132 at the front and a pair of closure plates 129—129 at the side and rear, such that the bar 128 is slidably confined in the guide.

The lower end of bar 128 includes a gauge carrier 133 which is attached to bar 128 by screws 134. Carrier 133 includes a roller 135 journalled upon a pin 136 projecting from the carrier. This roller rests upon the surface of the table 2, adapting the carrier to be shifted without resistance along the surface of the table during motion of the carrier 133 toward or away from the stack 9. The carrier 133 includes a gauging screw 137 having a head 138 adapted to contact the side of the stack, the screw being locked in an adjusted position by a screw 140 threaded into the carrier 133. The position of head 138 is precisely adjusted relative to the cutting edge of the bit to bring the cutting edge in registry the corner portion of the stack when the head 138 contacts the stack.

Figure 26:
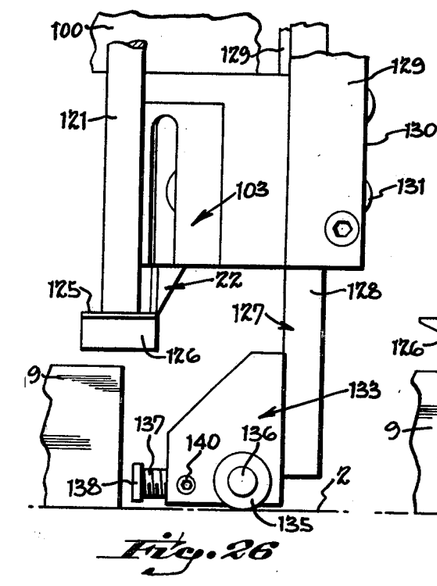
FIGURE 26 is a fragmentary side view projected from FIGURE 25, further detailing the sensing element which contacts the side of the stack.

During the cutting stroke, the mounting block 100 shifts downwardly with reference to the bar 128, and the engagement of the presser foot with the top of the stack causes the sensing element 127 to be shifted toward the stack, as described above through operation of the compression spring 110, thus bringing the head 138 into sensing contact with the stack. It will be understood that the gauge carrier 133 is located in a position laterally clear of the bit 22 (FIGURE 25) to avoid interference during the cutting stroke. As the head assembly shifts upwardly at the end of the cutting stroke, the bit holder 103 and gauge carrier 133 move to the retracted position, while the carrier 133 remains in tracking engagement with the table surface, as shown in FIGURE 26.

*Fixed Cornering Head*

The fixed cornering head (FIGURES 27–29) is used at one corner in four corner rounding operations, as indicated generally at 141 in FIGURES 30–32. The fixed head is located with reference to the guides or fixtures which locate one corner of the stack at a fixed reference point. It will be noted that any deviation in size or divergence in the angle of sheets, as indicated by the broken lines, is (FIGURES 30–32) accommodated by the shiftable heads but that no accommodation is required at the gauged corner which is acted upon by the fixed head.

Figure 27:
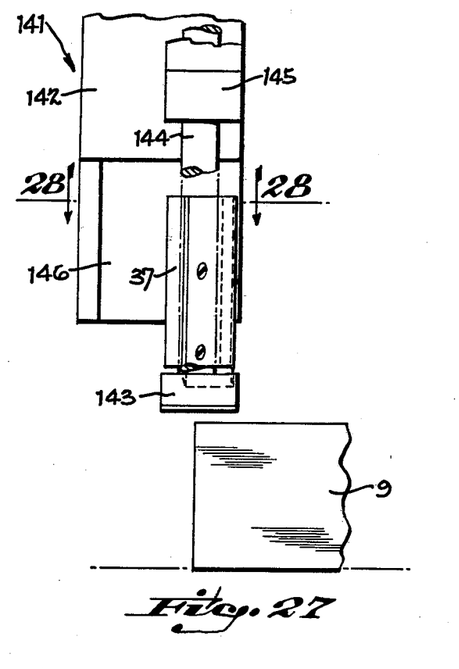
FIGURE 27 is a fragmentary side elevation showing the cornering head in which the rounding bit is mounted in a fixed position.
Figure 28:
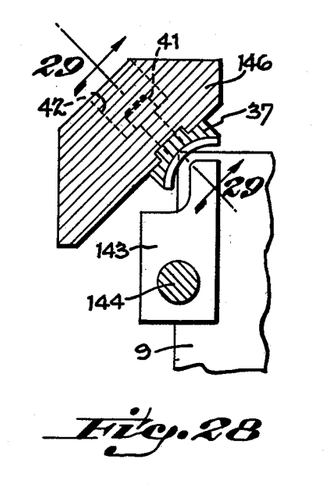
FIGURE 28 is a sectional view taken along line 28—28 of FIGURE 27, further detailing the mounting of the fixed bit.

Referring to FIGURE 27, the fixed head 141 includes a mounting block 142 adapted to be mounted upon the dovetail rail 14 of the cross beam 3, as described earlier. The block 142 includes a presser foot 143 mounted on a spring-loaded rod 144 slidably mounted in lugs 145. In the present instance however, the rod 144 is not interconnected with the bit holder.

Figure 29:
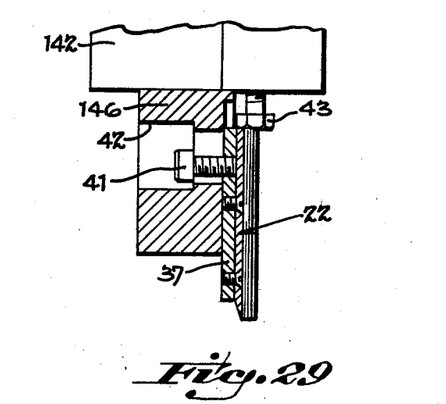
FIGURE 29 is a sectional view taken along line 29—29 of FIGURE 28, further detailing the mounting of the fixed bit.

As best shown in FIGURE 29, the bit holder 146 is attached directly by screws (not shown) to the lower end of the mounting block 142. The bit 22 is secured to an adaptor plate 37, as described earlier (FIGURE 4) which is adjustably clamped to the holder by a screw 41 passing through a vertical slot 42. A screw 43, threaded into the lower end of the mounting block 142, holds the bit 22 in its vertically adjusted position.

Having described my invention, I claim:

1. A machine for rounding the corner of a stack of sheets comprising, a support structure having a stack-supporting surface, a rail mounted above said surface, means adapted to reciprocate the rail relative to said surface, a corner-rounding head mounted on the rail, a bit holder mounted on said head, said bit holder being movable in a plane generally parallel to the stack-supporting surface, a corner rounding bit mounted on said bit holder and having a cutting edge projecting toward said supporting surface, a spring-loaded presser foot mounted on said head and adapted to engage the top of a stack resting on said stack-supporting surface, a sensing element projecting from the movable bit holder beyond said cutting edge and movable with said bit holder and bit in said plane, spring biasing means normally urging the bit holder toward the side of the stack, and actuating means interconnecting said spring-loaded presser foot and movable bit holder, said spring-loaded presser foot adapted to shift the movable bit holder normally to a retracted position counter to said spring biasing means, whereby upon downward movement of the rail, the presser foot engages the top of the stack and shifts relative to the rounding head, adapting said spring biasing means to shift said movable bit holder toward the side of the stack before the said cutting edge reaches the top of the stack, adapting the sensing element to shift to a gauging position relative to the side of the stack and to locate the movable bit before the cutting edge reaches the top of the stack to round the corner thereof.

2. A machine for rounding at least two corners of a stack of sheets comprising, a support structure having a stack-supporting surface, a rail mounted above the stack-supporting surface, power means for reciprocating the rail relative to the stack-supporting surface, stack locating means mounted relative to said stack-supporting surface and adapted to locate a stack of sheets thereon and to provide at least one gauged corner, a plurality of corner rounding heads mounted on the rail, a bit holder mounted on each of said heads, one of said bit holders being mounted in a fixed position relative to the said locating means, at least one of said bit holders being movable in a plane generally parallel to the stack-supporting surface, a respective corner rounding bit mounted on each of said bit holders and having a cutting edge projecting toward said supporting surface, a spring-loaded presser foot mounted on each of said heads and adapted to engage the top of a stack resting on said stack-supporting surface, a sensing element projecting from said movable bit holder beyond said cutting edge and movable in unison therewith, spring biasing means normally urging said movable bit holder toward the side of the stack, and actuating means interconnecting said presser foot and movable bit holder, said presser foot adapted to shift the movable bit holder normally to a retracted position counter to said spring biasing means, whereby upon movement of the rail toward the supporting surface the presser foot engages the top of the stack and shifts upwardly relative to the rounding head, adapting said spring biasing means to shift said movable bit holder toward the side of the stack before the said cutting edge reaches the top of the stack, adapting the sensing element to shift to a gauging position relative to the side of the stack to locate the movable bit relative to the stack before the cutting edge reaches the top of the stack to round the corner thereof.

3. A cornering head for rounding the corners of a stack of sheets, the head adapted to be mounted on a paper drilling machine or the like having a stack support structure and a cross beam mounted for reciprocation relative to the support structure, said cornering head comprising, a mounting block adapted to be mounted on said cross beam, a bit holder shiftably mounted relative to said block, a corner rounding bit mounted on said bit holder and having a cutting edge, a presser element mounted for shifting motion relative to said mounting block, said presser element normally residing in an extended position, a sensing element connected to said bit holder, and actuating means interconnecting said presser element and bit holder, said means adapted to shift the bit holder and bit in response to motion of the presser element, said bit holder and bit normally residing in a retracted position and adapted to be shifted to an advanced position in response to movement of the presser element from the extended position to a retracted position whereby, upon reciprocation of said mounting block toward the top of a stack of sheets resting on the support structure, said presser element engages the top of the stack and is shifted toward a retracted position thereby moving the bit holder from the retracted position toward the side of the stack, adapting the sensing element to shift to a gauging position relative to the side of the stack to locate the bit relative to the stack before the cutting edge thereof reaches the top of the stack to round the corner thereof.

4. A cornering head for rounding the corners of a stack of sheets, the head adapted to be mounted on a paper drilling machine or the like having a stack support structure and a cross beam mounted for reciprocation above the support structure, said round cornering head comprising, a mounting block adapted to be mounted on said cross beam, a bit holder shiftably mounted on said block for universal motion in a generally horizontal plane, a corner rounding bit mounted on said bit holder and having a cutting edge projecting downwardly toward said stack support structure, a spring-loaded presser element mounted for generally vertical motion relative to said mounting block, and normally residing in an extended position, a sensing element connected to said bit holder, and actuating means interconnecting said presser element and bit holder, said bit holder normally residing in a retracted position and adapted to be shifted to an advanced position in response to upward movement of the presser element relative to the mounting block, from the extended position toward a retracted position, whereby, upon reciprocation of said mounting block toward the top of a stack of sheets resting upon the support structure, said sensing element engages the top of the stack and is shifted upwardly, thereby moving the bit holder from retracted position toward the stack adapting the sensing element to shift to a gauge position relative to the side of the stack to locate the bit relative to the stack before the cutting edge thereof reaches the top of the stack to round the corner thereof.

5. A cornering head for rounding the corners of a stack of sheets, the head adapted to be mounted on a paper drilling machine or the like having a work support structure and a cross beam mounted for reciprocation above the support structure, said cornering head comprising, a mounting block adapted to be attached to said cross beam, said block having a slideway formed in the lower portion thereof, a bit holder having an upper portion slidably engaged in said slideway for motion in a generally horizontal plane relative to said mounting block, a corner rounding bit mounted in said bit holder and having a cutting edge projecting downwardly therefrom, a stack sensing element projecting downwardly from said bit holder, a presser element slidably mounted on said mounting block and having a lower end projecting downwardly therefrom, a first spring means engaging the presser element and biasing the same downwardly to an extended position, actuating means interconnecting the presser element and bit holder, said sensing element adapted to normally hold said bit holder and bit to a retracted position through operation of the first spring means, and second spring means engaged against the bit holder and adapted to urge the bit holder and bit toward an advanced position whereby, upon downward reciprocation of the mounting block toward the top of a stack resting on said support structure, the presser element engages the top of the stack and is shifted upwardly relative to the mounting block, adapting said second spring means to shift the bit holder from the retracted toward an advanced position, causing the sensing element to shift to a gauging position to locate the cutting edge of the bit with respect to the corner portion of the stack.

6. A cornering head for rounding the corners of a stack of sheets, the head adapted to be mounted on a paper drilling machine or the like having a work support structure and a cross beam mounted for reciprocation above the support structure, said round cornering head comprising, a mounting block adapted to be attached to said cross beam, a bit holder having an upper portion slidably engaged in the lower portion of the block for shifting motion relative to said mounting block, a corner rounding bit mounted in said bit holder and having a cutting edge projecting downwardly therefrom, a stack sensing element projecting downwardly from said bit holder to a plane below said cutting edge, a presser element slidably mounted on said mounting block and having a lower end projecting downwardly to a plane below said cutting edge, an actuating block mounted on said presser element, a first compression spring seated against said actuating block and biasing the sensing element downwardly to an extended position, actuating means interconnecting the actuating block and bit holder, whereby the sensing element normally shifts the bit holder and bit to a retracted position through operation of the first compression spring, a second compression spring engaged against the bit holder and normally urging the bit holder toward an advanced position, whereby upon downward reciprocation of the mounting block toward the top of a stack resting on said support structure, the presser element engages the top of the stack and is shifted upwardly relative to the mounting block, adapting said second compression spring to shift the bit holder from the retracted toward an advanced position, causing the sensing element shift to a gauging position to locate the cutting end of the bit with respect to the corner portion of the stack.

References Cited in the file of this patent

UNITED STATES PATENTS

| | | |
|---|---|---|
| 1,476,155 | Dexter | Dec. 4, 1923 |
| 2,318,619 | Noel | May 11, 1943 |
| 2,356,046 | Garlick | Aug. 15, 1944 |
| 2,643,588 | Burroughs | June 30, 1953 |
| 2,656,888 | Cruzan | Oct. 27, 1953 |
| 2,734,577 | Spiller et al. | Feb. 14, 1956 |
| 2,887,156 | Whitcomb | May 19, 1959 |

FOREIGN PATENTS

| | | |
|---|---|---|
| 832,487 | Germany | Feb. 25, 1952 |